United States Patent
Liao

(10) Patent No.: US 10,823,979 B2
(45) Date of Patent: Nov. 3, 2020

(54) SMART CONTACT LENS FOR DISPLAYING IMAGES AND LIGHT-TRANSMITTING BODY THEREOF

(71) Applicant: mataVIEW Photology Co. Ltd., Taichung (TW)

(72) Inventor: Chien-Shou Liao, New Taipei (TW)

(73) Assignee: MATAVIEW PHOTOLOGY CO. LTD., Taichung (TW)

(*) Notice: Subject to any disclaimer, the term of this patent is extended or adjusted under 35 U.S.C. 154(b) by 44 days.

(21) Appl. No.: 15/865,397

(22) Filed: Jan. 9, 2018

(65) Prior Publication Data

US 2019/0025607 A1 Jan. 24, 2019

(30) Foreign Application Priority Data

Jul. 24, 2017 (TW) .............................. 106124740 A

(51) Int. Cl.
*G02C 7/04* (2006.01)
*G02C 11/00* (2006.01)

(52) U.S. Cl.
CPC ................ *G02C 7/04* (2013.01); *G02C 11/10* (2013.01)

(58) Field of Classification Search
CPC ..................................................... G02B 27/01
See application file for complete search history.

(56) References Cited

U.S. PATENT DOCUMENTS

| 8,743,464 | B1* | 6/2014 | Amirparviz | G02B 27/01 359/633 |
| 9,810,910 | B1* | 11/2017 | Park | G02B 27/0172 |
| 2004/0027536 | A1* | 2/2004 | Blum | B29D 11/00826 351/159.03 |
| 2019/0073800 | A1* | 3/2019 | Lochny | G06F 3/011 |

FOREIGN PATENT DOCUMENTS

| TW | I531178 B | 4/2016 |
| TW | 201723600 A | 7/2017 |

* cited by examiner

*Primary Examiner* — Robin J Mishler
(74) *Attorney, Agent, or Firm* — Li & Cai Intellectual Property (USA) Office

(57) ABSTRACT

The present disclosure provides a smart contact lens for displaying images and a light-transmitting body thereof. The smart contact lens includes a light-transmitting body, an image-sensing module and an image display module. The light-transmitting body has a first view window and a second view window. The image-sensing module diverges from the second view window by a predetermined horizontal distance. The image display module diverges from the first view window by a predetermined horizontal distance. The light-transmitting body has a second transmission path formed between the first view window and the image display module. An internal image source generated by the image display module is transmitted to an eyeball through the second transmission path.

11 Claims, 16 Drawing Sheets

SMART CONTACT LENS FOR DISPLAYING IMAGES AND LIGHT-TRANSMITTING BODY THEREOF

FIELD OF THE INVENTION

The present disclosure relates to a smart contact lens and a light-transmitting body thereof, and more particularly to a smart contact lens having an image displaying function, and a light-transmitting body thereof.

BACKGROUND OF THE INVENTION

Contact lenses have been a popular alternative to glasses since being invented in the 1970s. Since improved manufacturing methods have lowered production costs and many consider their appearance to be more attractive with contact lenses than with glasses, the popularity of contact lenses has surged. With the change in life style, there is an increasing demand for disposable contact lenses. A growing number of people have turned to disposable contact lenses because they are cheap and require no maintenance, but there is still room for improvement in the art.

SUMMARY OF THE INVENTION

One aspect of the present disclosure relates to a smart contact lens for displaying images and a light-transmitting body thereof.

One of the embodiments of the present disclosure provides a smart contact lens for displaying images, including a light-transmitting body, a control module, and an image display module. The light-transmitting body has a view window. The control module is received inside the light-transmitting body. The image display module includes a plurality of image display chips received inside the light-transmitting body and electrically connected to the control module, and the image display chip diverges from the view window by a predetermined horizontal distance. The light-transmitting body has a transmission path formed therein between the view window and the image display module, and an external image source is transmitted to the light-transmitting body through the view window. The external image source that has been received by the view window directly passes through the light-transmitting body and then is projected onto an eyeball, and an internal image source generated by cooperation of the image display chips of the image display module is transmitted to the eyeball through the transmission path.

Another one of the embodiments of the present disclosure provides a light-transmitting body for totally enclosing one of the control module, the image-sensing module, the image display module, the wireless transmission module, the bio-sensing module, and the power supply module. The light-transmitting body has a view window, and an external image source that has been received by the view window directly passes through the light-transmitting body and then is projected onto an eyeball. The light-transmitting body has a first light-transmitting portion connected to the view window, a second light-transmitting portion surroundingly connected to the first light-transmitting portion, a third light-transmitting portion surroundingly connected to the second light-transmitting portion, and a fourth light-transmitting portion surroundingly connected to the third light-transmitting portion.

Yet another one of the embodiments of the present disclosure provides a smart contact lens for displaying images, including a light-transmitting body, a control module and an image display module. The light-transmitting body has a view window. The control module is received inside the light-transmitting body. The image display module is received inside the light-transmitting body and electrically connected to the control module, and the image display module diverges from the view window by a predetermined horizontal distance. The light-transmitting body has a transmission path formed therein between the view window and the image display module. An internal image source generated by the image display module is transmitted to an eyeball through the transmission path.

Therefore, the internal image source generated by the image display module can be transmitted to an eyeball through the transmission path by matching the features of "the light-transmitting body has a view window" and "the light-transmitting body has a transmission path formed between the view window and the image display module".

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a smart contact lens for displaying images and a light-transmitting body thereof according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

First Embodiment

Figure 1:
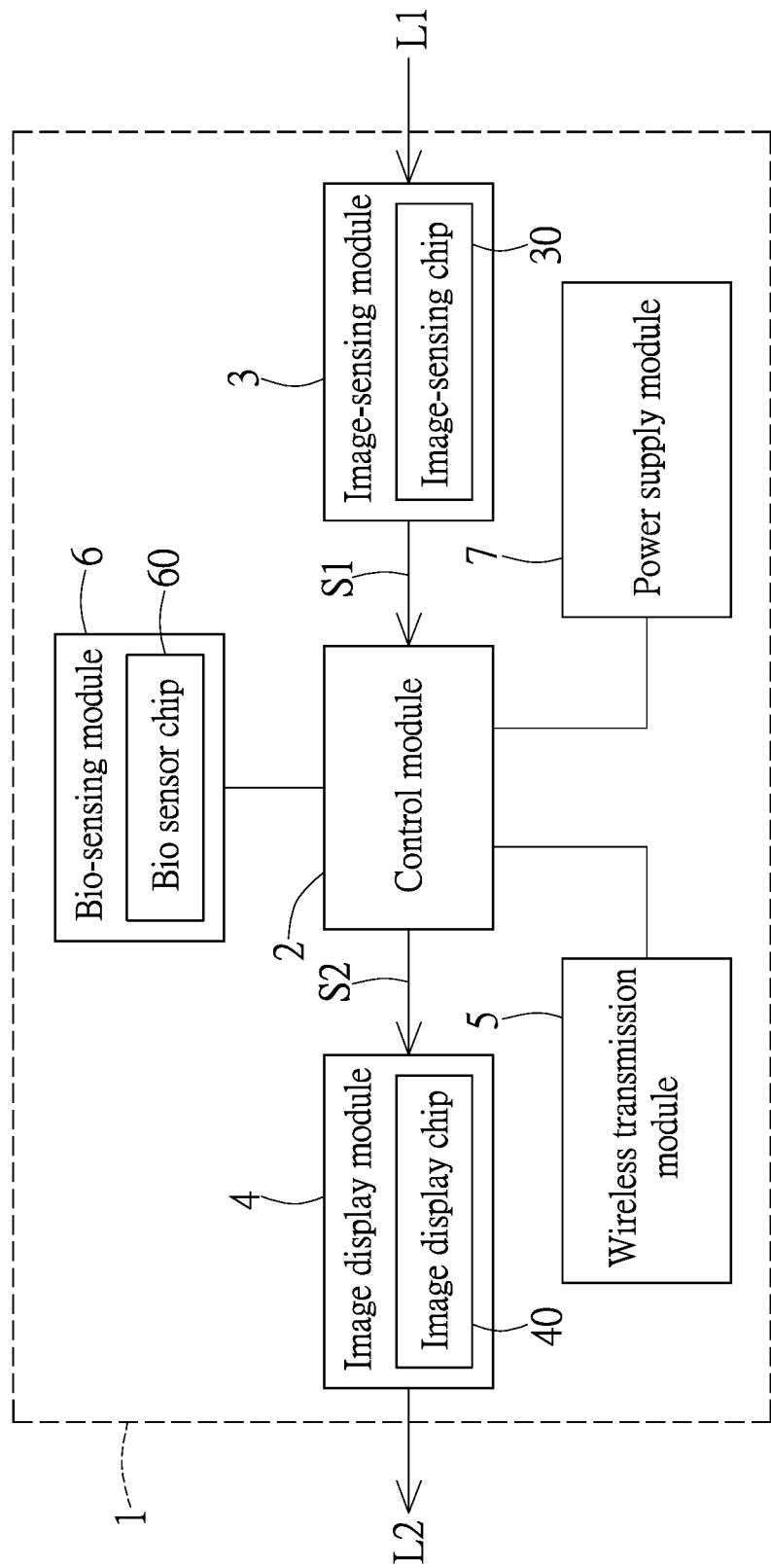
FIG. 1 shows a function block diagram of a smart contact lens according to the present disclosure.
Figure 2:
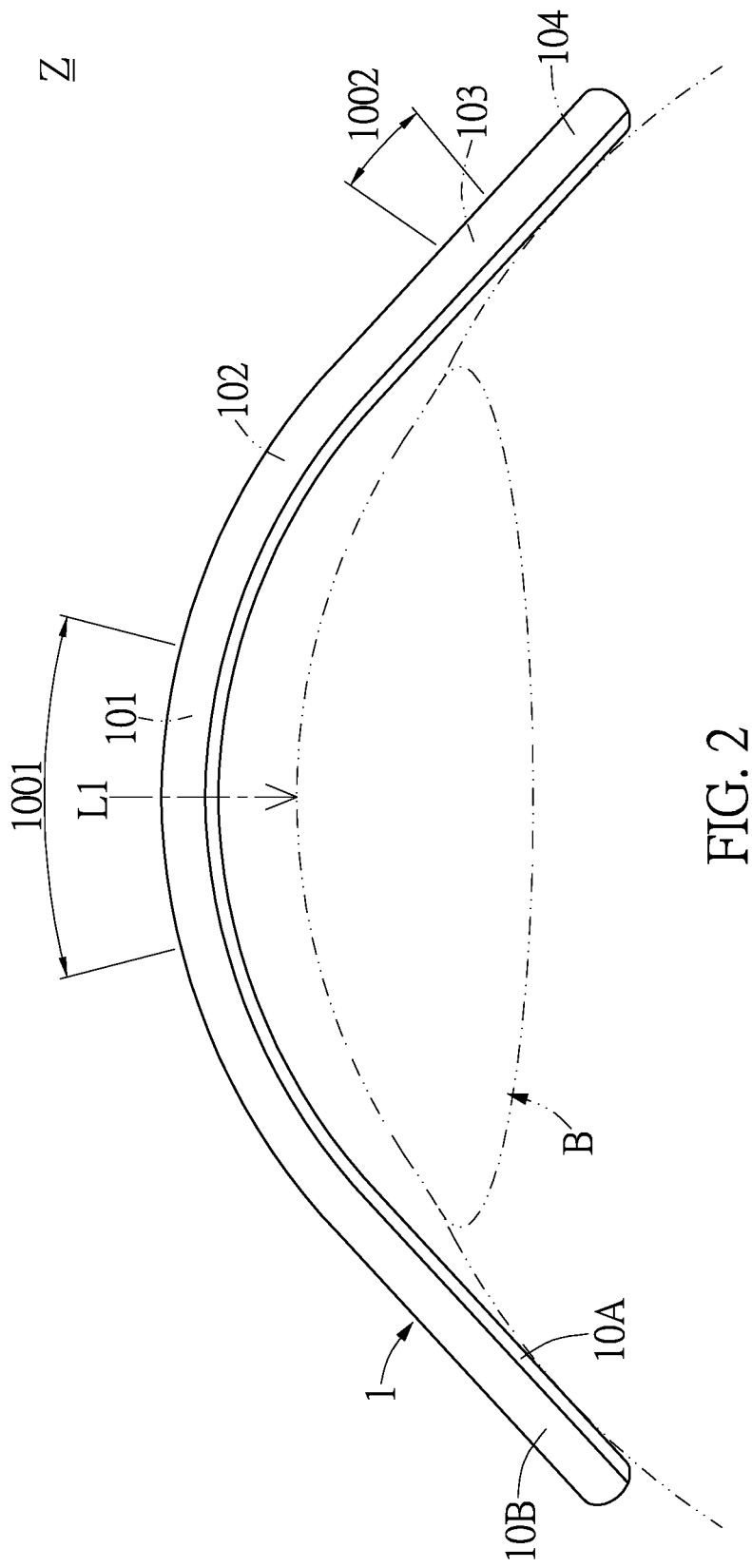
FIG. 2 shows a front schematic view of a light-transmitting body according to a first embodiment of the present disclosure.
Figure 3:
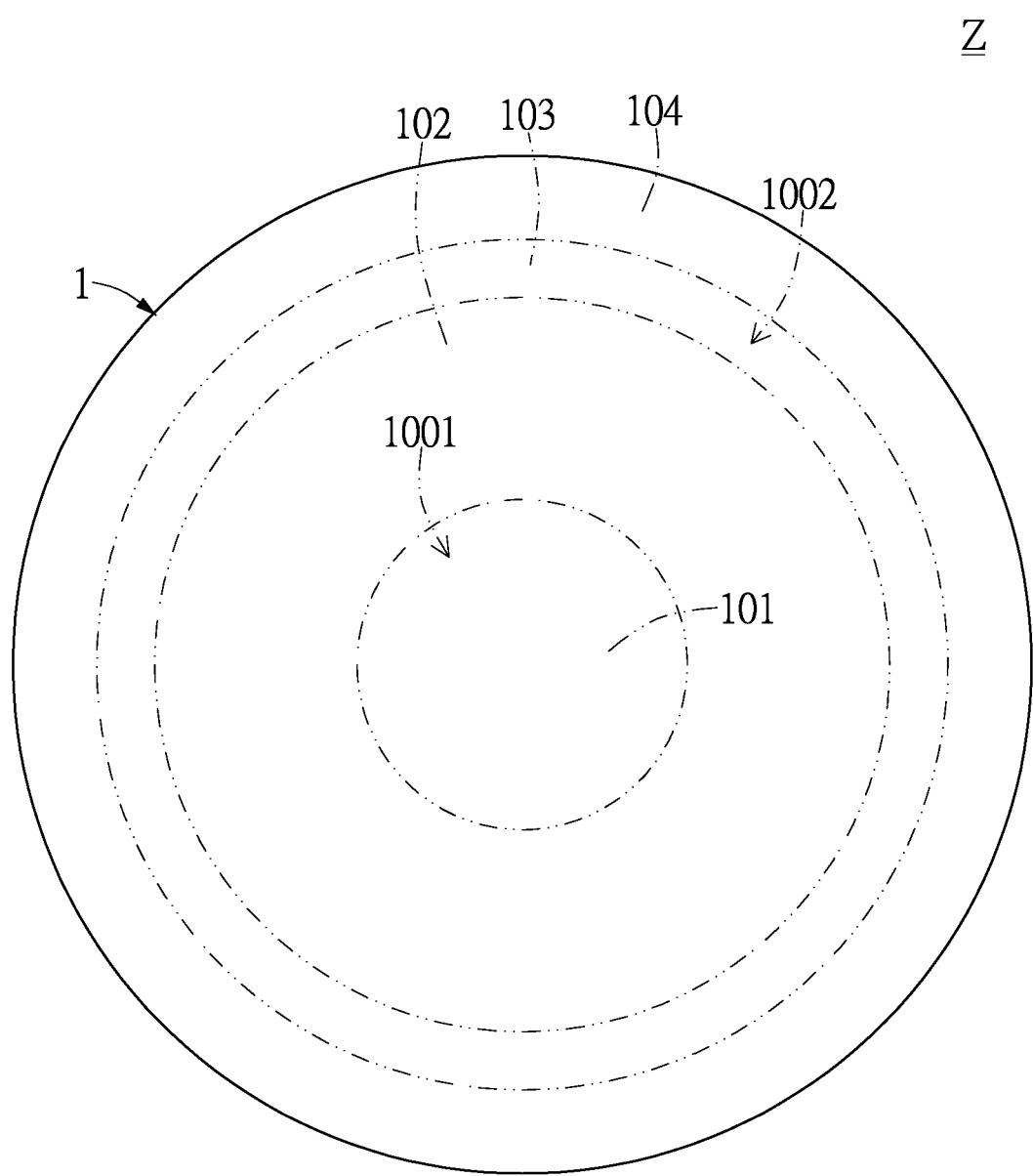
FIG. 3 shows a top schematic view of the light-transmitting body according to the first embodiment of the present disclosure.
Figure 4:
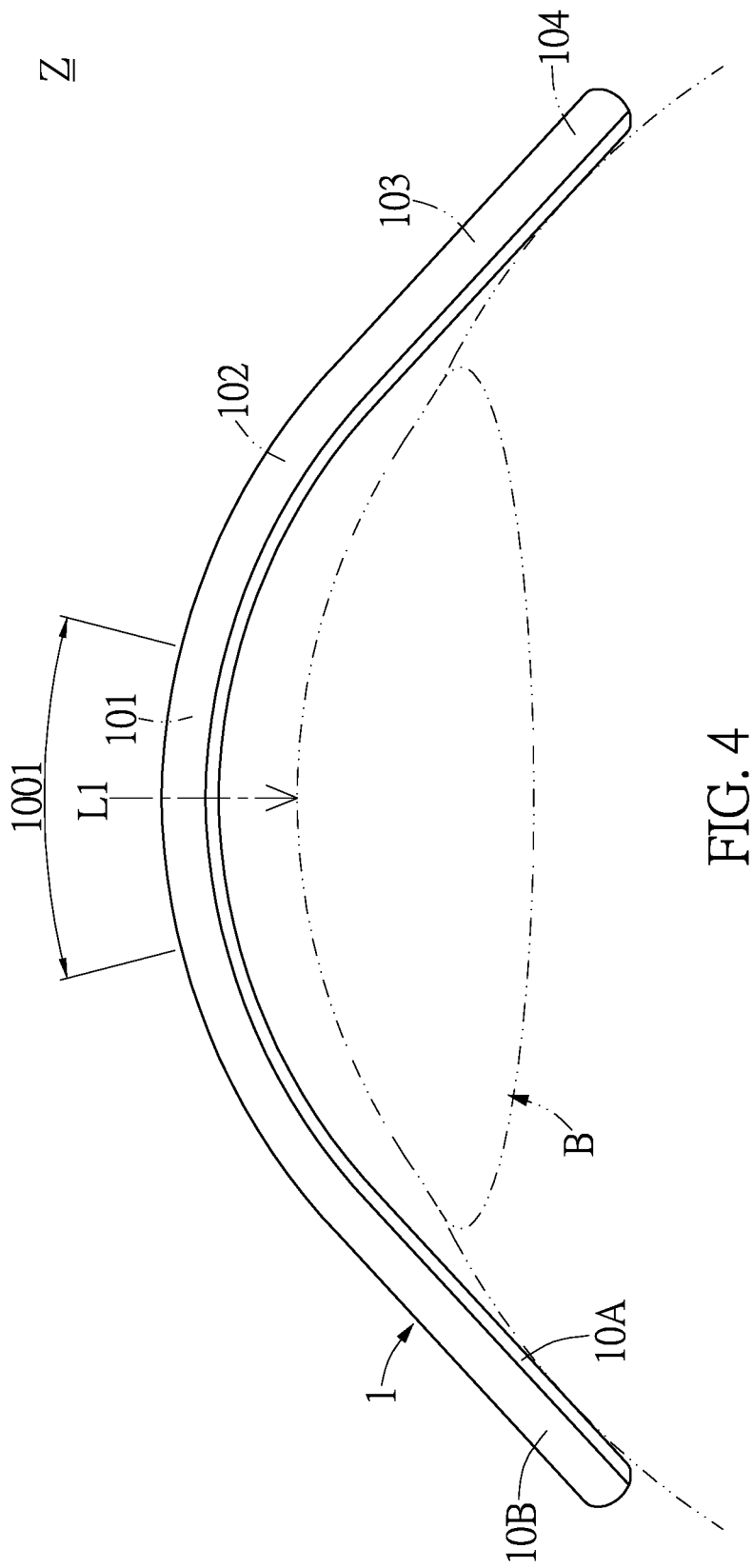
FIG. 4 shows a front schematic view of another light-transmitting body according to the first embodiment of the present disclosure.

Referring to FIG. 1 to FIG. 3, the first embodiment of the present disclosure provides a light-transmitting body 1 for totally enclosing one of the control module 2, the image-sensing module 3, the image display module 4, the wireless transmission module 5, the bio-sensing module 6, and the power supply module 7.

More particularly, referring to FIG. 2 and FIG. 3, the light-transmitting body 1 has a first view window 1001 and a second view window 1002 surrounding the first view window 1001, and an external image source L1 that has been received by the first view window 1001 can directly pass through the light-transmitting body 1 and then be projected onto an eyeball B. In addition, the light-transmitting body 1 has a first light-transmitting portion 101 connected to the first view window 1001, a second light-transmitting portion 102 surroundingly connected to the first light-transmitting portion 101, a third light-transmitting portion 103 connected to the second view window 1002 and surroundingly connected to the second light-transmitting portion 102, and a fourth light-transmitting portion 104 surroundingly connected to the third light-transmitting portion 103. It should be noted that both the first view window 1001 and the second view window 1002 (two outer surfaces) of the light-transmitting body 1 are light-transmitting areas to allow the external image source L1 to pass therethrough, and the other outer surface of the light-transmitting body 1 is an opaque area.

For example, both the first view window 1001 and the second view window 1002 have an optical microstructure or an optical material layer disposed thereon so as to allow the external image source L1 to smoothly pass the first view window 1001 and the second view window 1002 and enter the light-transmitting body 1. In addition, the light-transmitting body 1 further includes a first light-transmitting layer 10A and a second light-transmitting layer 10B. The first light-transmitting layer 10A is attached to the eyeball B, and the second light-transmitting layer 10B is disposed on the first light-transmitting layer 10A. Moreover, one of the control module 2, the image-sensing module 3, the image display module 4, the wireless transmission module 5, the bio-sensing module 6, and the power supply module 7 can be totally enclosed between the first light-transmitting layer 10A and the second light-transmitting layer 10B, and both the first view window 1001 and the second view window 1002 are disposed on the second light-transmitting layer 10B. Furthermore, the wireless transmission module 5 may be a circuit layout having a predetermined pattern. However, it is merely an example and is not meant to limit the scope of the present disclosure.

It should be noted that the second view window 1002 can be omitted from the light-transmitting body 1 of the first embodiment, and the first view window 1001 can be the only one used as shown in FIG. 2.

Second Embodiment

Figure 5:
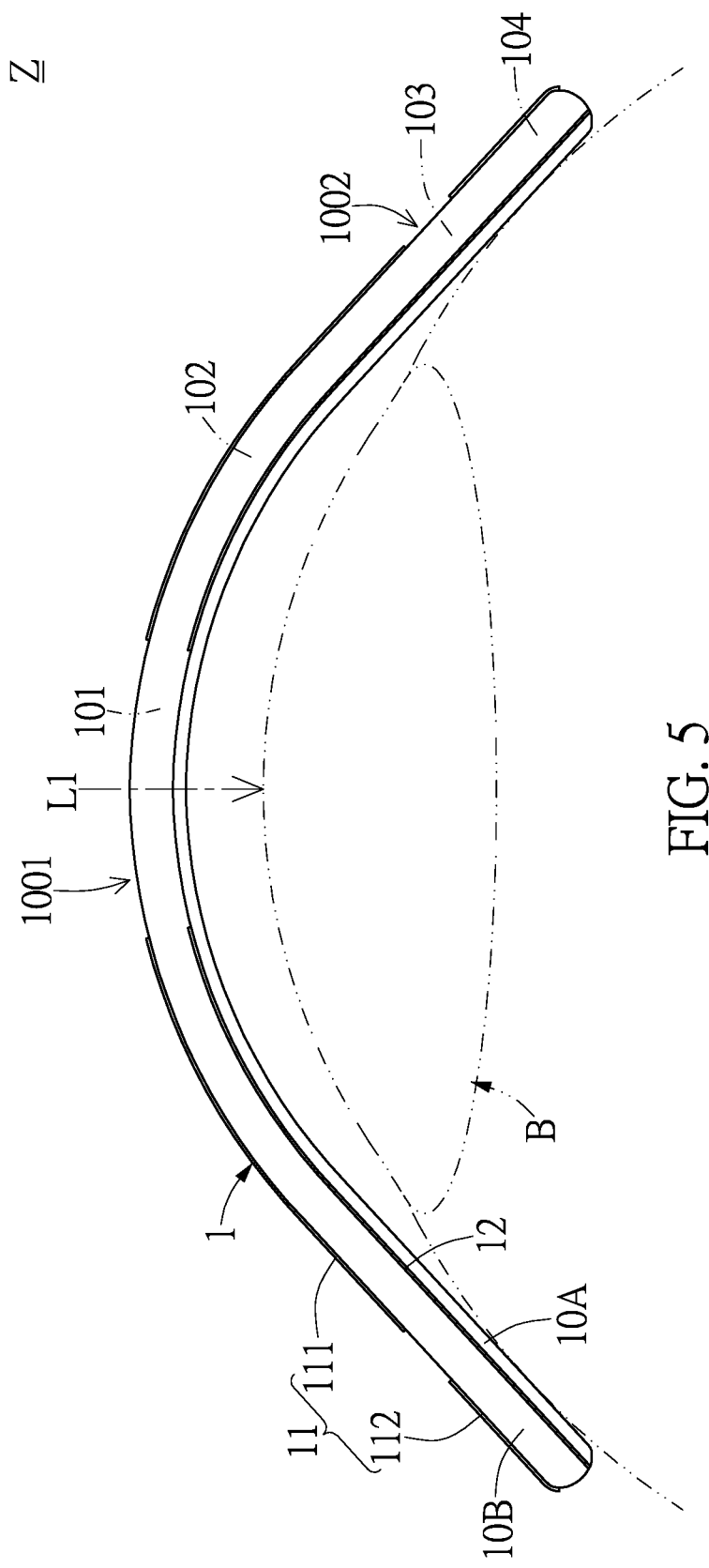
FIG. 5 shows a front schematic view of a light-transmitting body according to a second embodiment of the present disclosure.
Figure 6:
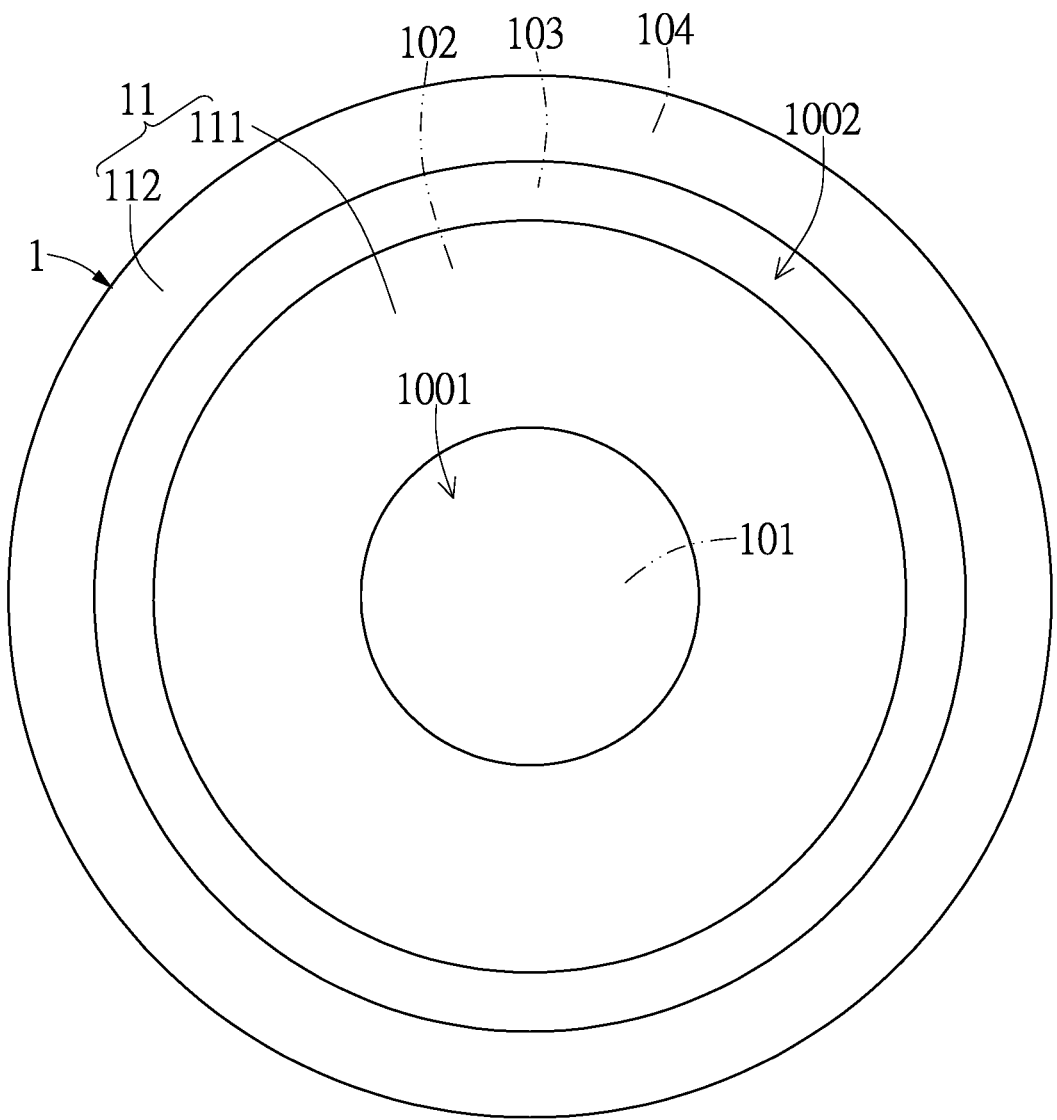
FIG. 6 shows a top schematic view of the light-transmitting body according to the second embodiment of the present disclosure.

Referring to FIG. 5 and FIG. 6, the second embodiment of the present disclosure provides a light-transmitting body 1. Comparing FIG. 5 with FIG. 2, and FIG. 6 with FIG. 3, the difference between the second embodiment and the first embodiment is as follows: in the second embodiment, the light-transmitting body 1 has a first reflective structure 11 and a second reflective structure 12 opposite to the first reflective structure 11.

For example, referring to FIG. 5 and FIG. 6, the first reflective structure 11 has a first outer reflective layer 111 connected between the first view window 1001 and the second view window 1002, and a second outer reflective layer 112 separated from the first outer reflective layer 111 and surrounding the second view window 1002. For example, the first reflective structure 11 and the second reflective structure 12 can be made of any reflective material with retro reflectors, but it is merely an example and is not meant to limit the scope of the present disclosure.

Figure 7:
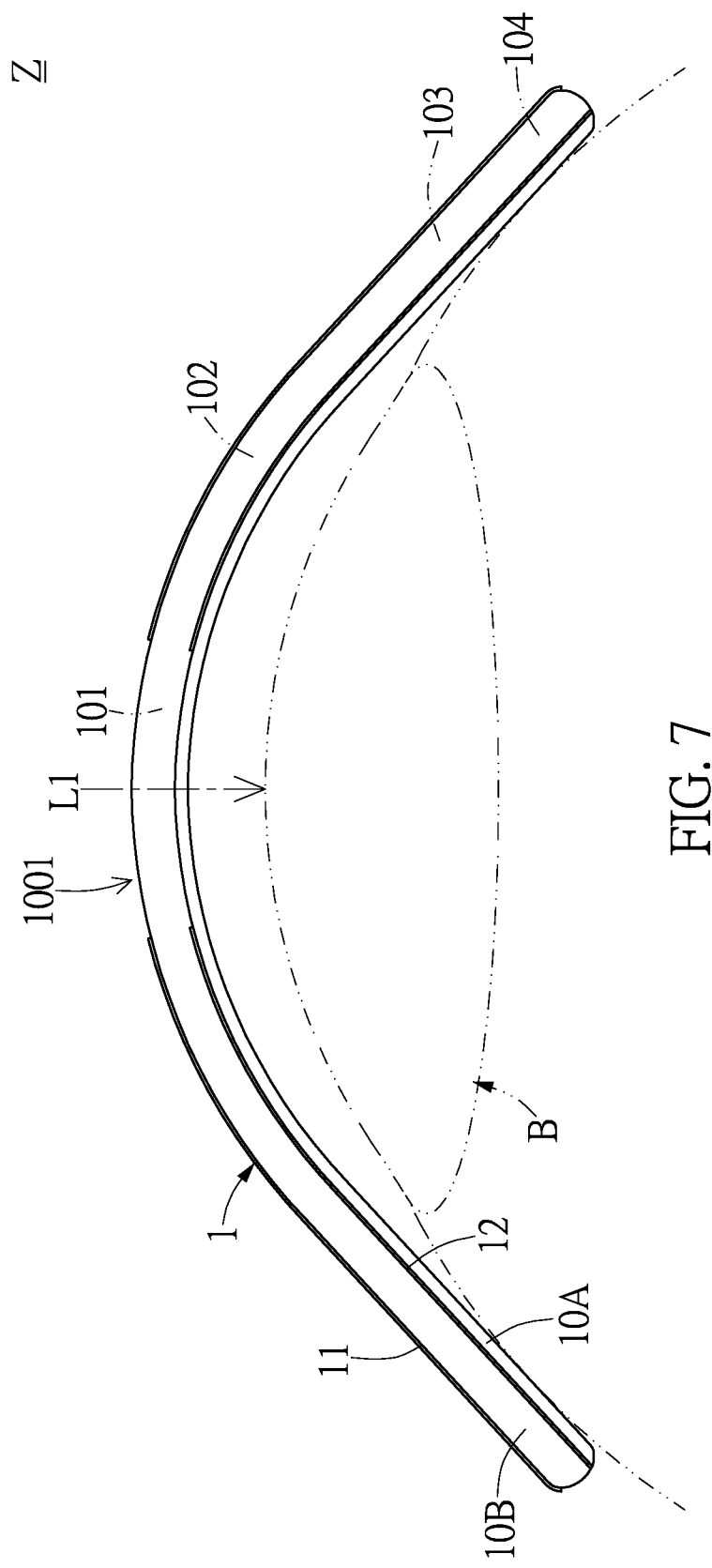
FIG. 7 shows a front schematic view of another light-transmitting body according to the second embodiment of the present disclosure.

It should be noted that the second view window 1002 can be omitted from the light-transmitting body 1 of the first embodiment, and the first view window 1001 can be the only one used as shown in FIG. 7.

Hence, the present disclosure can, according to different requirements, select one of the light-transmitting bodies 1 for use, as respectively shown in FIG. 2, FIG. 4, FIG. 5 and FIG. 7 according to the different requirements.

Third Embodiment

Figure 8:
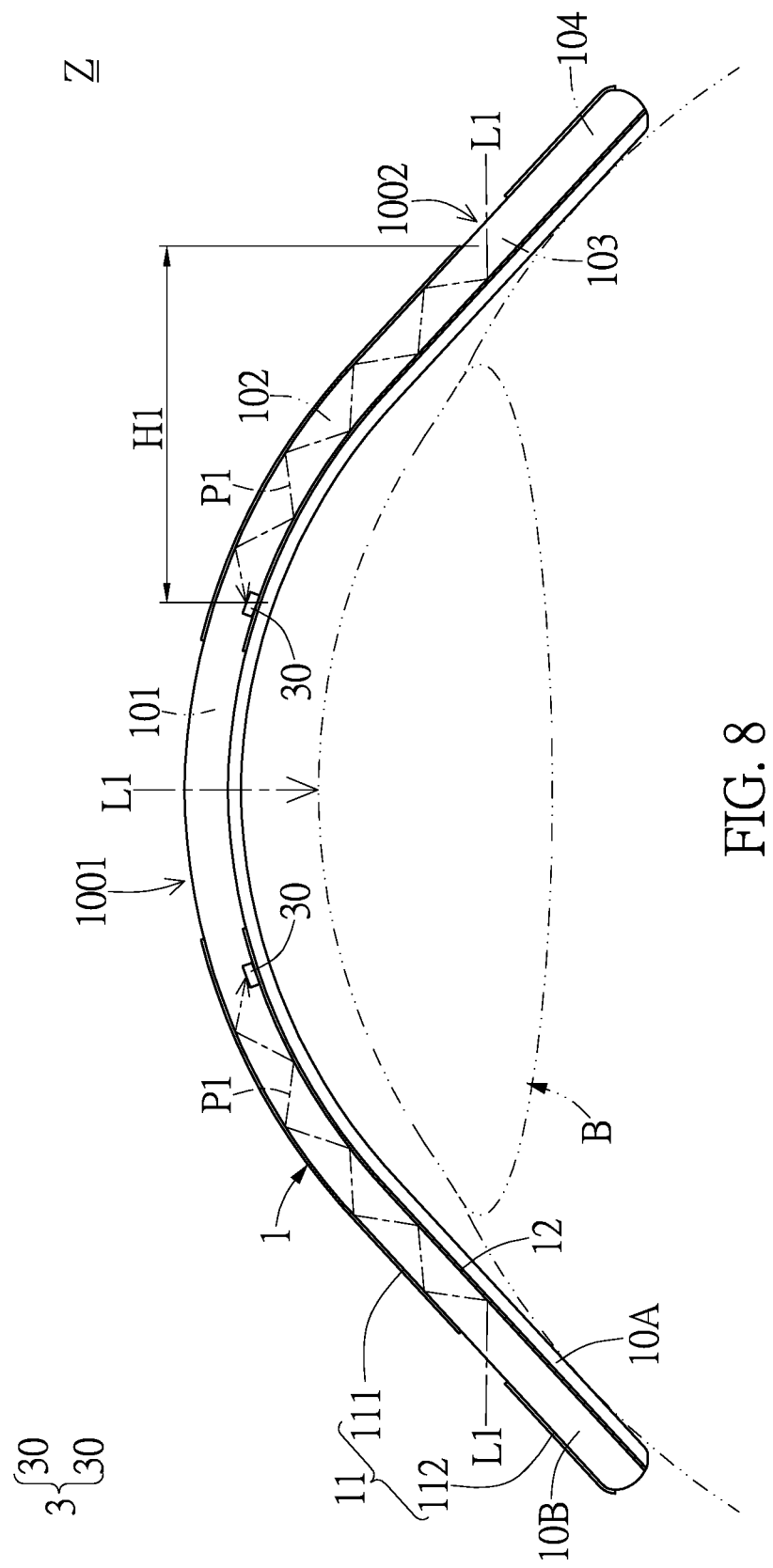
FIG. 8 shows a front schematic view of the smart contact lens according to a third embodiment of the present disclosure.
Figure 9:
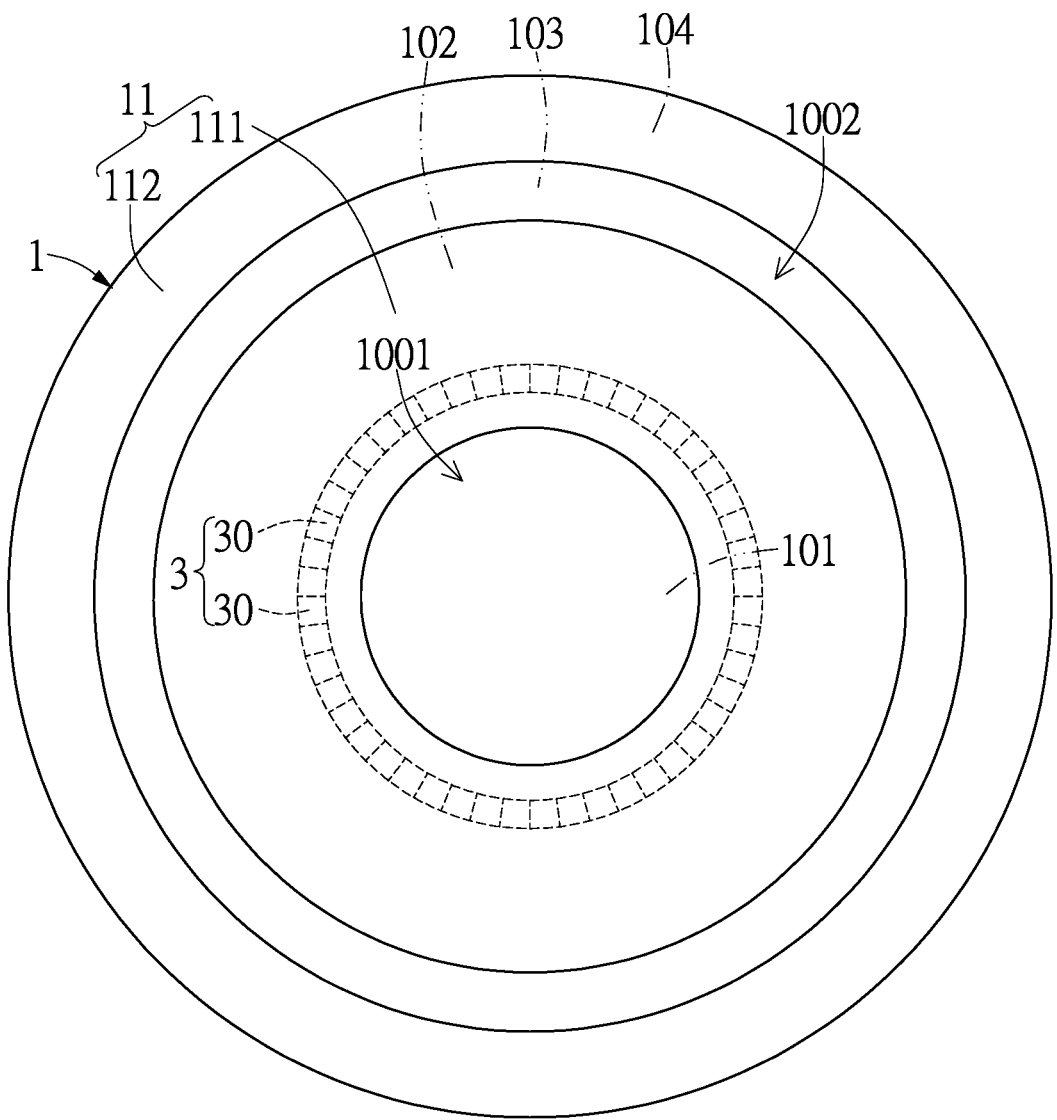
FIG. 9 shows a top schematic view of the smart contact lens according to the third embodiment of the present disclosure.

Referring to FIG. 8 and FIG. 9, the third embodiment of the present disclosure provides a smart contact lens Z with an image-capturing function, including a light-transmitting body 1, a control module (not shown), and an image-sensing module 3.

More particularly, referring to FIG. 1, FIG. 8 and FIG. 9, the light-transmitting body 1 has a first view window 1001 and a second view window 1002 surrounding the first view window 1001, and the control module 2 is received inside the light-transmitting body 1. In addition, the image-sensing module 3 includes a plurality of image-sensing chips 30 received inside the light-transmitting body 1 and electrically connected to the control module 2, and the image-sensing chip 30 diverges (is separated) from the second view window 1002 by a predetermined horizontal distance (such as a first predetermined horizontal distance H1).

More particularly, referring to FIG. 8 and FIG. 9, the light-transmitting body 1 has a transmission path (such as a first transmission path P1) formed in the light-transmitting body 1 and between the second view window 1002 and the image-sensing module 3, and an external image source L1 can be transmitted to the light-transmitting body 1 through the first view window 1001 and the second view window 1002, respectively. In addition, the external image source L1 that has been received by the first view window 1001 can directly pass through the light-transmitting body 1 and then can be projected onto an eyeball B, and the external image source L1 that has been received by the second view window 1002 can be transmitted to the image-sensing chips 30 of the image-sensing module 3 through the first transmission path P1 (that is to say, the external image source L1 can be transmitted along the first transmission path P1).

More particularly, referring to FIG. 8 and FIG. 9, the light-transmitting body 1 has a first reflective structure 11 and a second reflective structure 12 opposite to the first reflective structure 11. In addition, the external image source L1 that has been received by the second view window 1002 can be repeatedly reflected by the first reflective structure 11 and the second reflective structure 12 and then can be transmitted to the image-sensing chips 30 of the image-sensing module 3.

Whereby, referring to FIG. 1 and FIG. 8, the image-sensing module 3 can provide an image signal S1 according to the external image source L1 that has been received by the image-sensing module 3, and the image signal S1 can be transmitted from the image-sensing module 3 to the control module 2. Hence, the control module 2 can provide an information signal S2 according to the image signal S1, and the information signal S2 can be transmitted from the control module 2 to an image display module 4.

For example, referring to FIG. 8 and FIG. 9, the first reflective structure 11 has a first outer reflective layer 111 connected between the first view window 1001 and the second view window 1002, and a second outer reflective layer 112 separated from the first outer reflective layer 111 and surrounding the second view window 1002. In addition, the light-transmitting body 1 has a first light-transmitting portion 101 connected to the first view window 1001, a second light-transmitting portion 102 separated from the first view window 1001 and surroundingly connected to the first light-transmitting portion 101, a third light-transmitting portion 103 connected to the second view window 1002 and surroundingly connected to the second light-transmitting portion 102, and a fourth light-transmitting portion 104 separated from the second view window 1002 and surroundingly connected to the third light-transmitting portion 103. However, it is merely an example and is not meant to limit the scope of the present disclosure.

It should be noted that the image-sensing module 3 can be disposed inside one of the second light-transmitting portion 102 and the fourth light-transmitting portion 104. For example, the image-sensing module 3 is disposed inside the second light-transmitting portion 102 as shown in FIG. 8.

Fourth Embodiment

Figure 10:
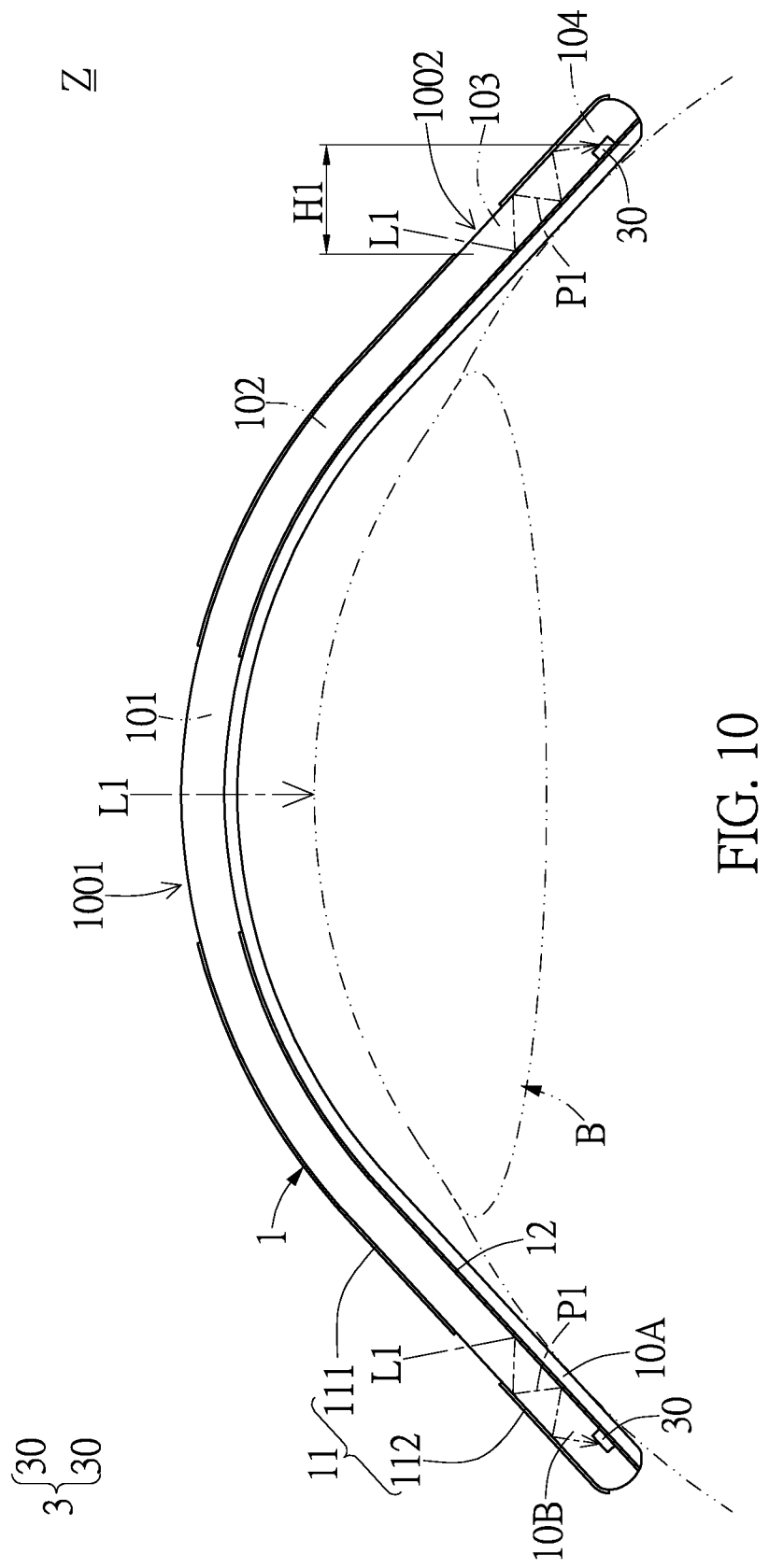
FIG. 10 shows a front schematic view of the smart contact lens according to a fourth embodiment of the present disclosure.

Referring to FIG. 10, the fourth embodiment of the present disclosure provides a smart contact lens Z with an image-capturing function, including a light-transmitting body 1, a control module (not shown), and an image-sensing module 3. Comparing FIG. 10 with FIG. 8, the difference between the fourth embodiment and the third embodiment is as follows: in the fourth embodiment, the image-sensing module 3 is disposed inside the fourth light-transmitting portion 104. That is to say, the image-sensing module 3 can be disposed inside the second light-transmitting portion 102 (as shown in the third embodiment of FIG. 8) or the fourth light-transmitting portion 104 (as shown in the fourth embodiment of FIG. 10) according to different requirements.

Fifth Embodiment

Figure 11:
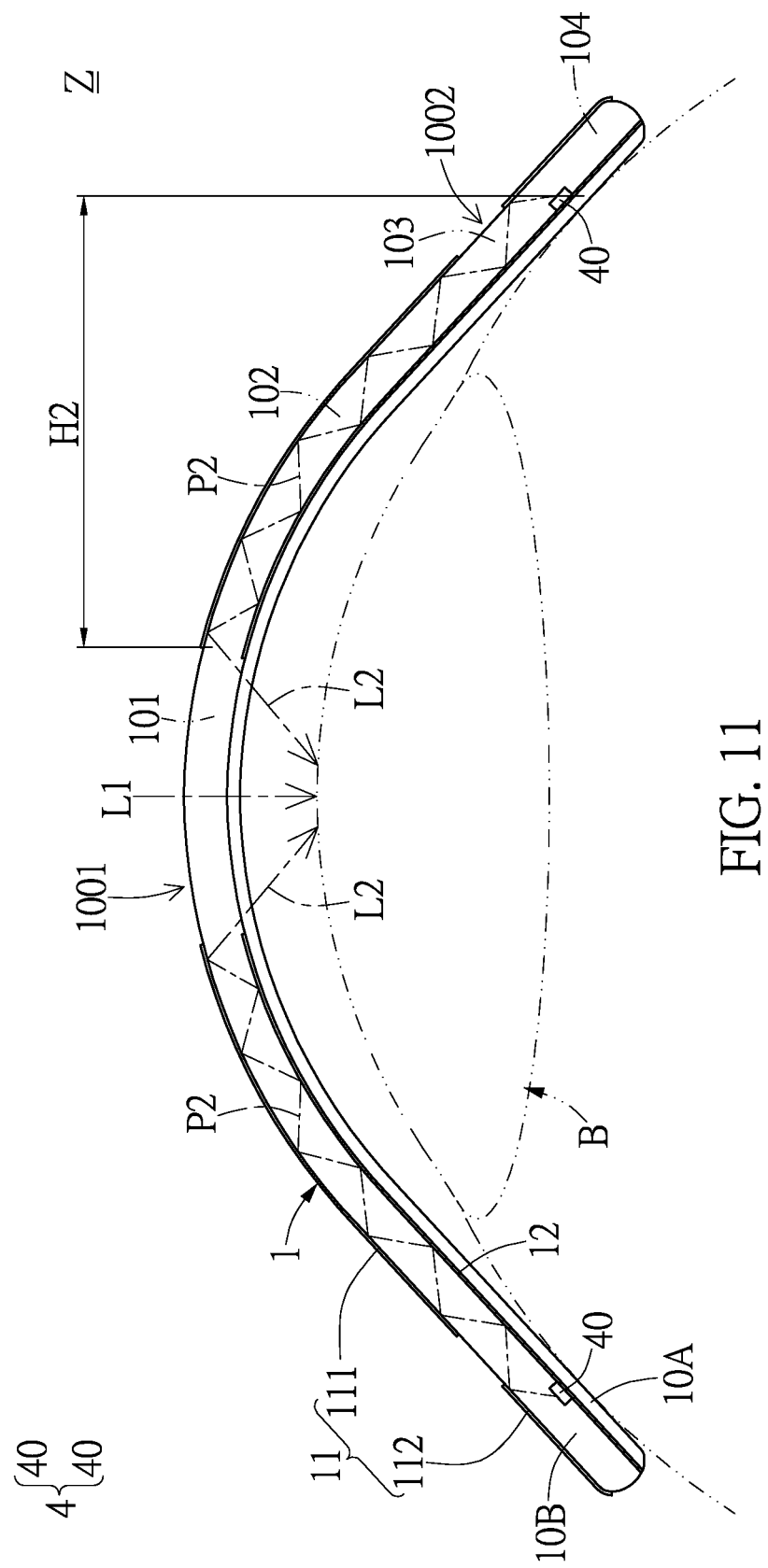
FIG. 11 shows a front schematic view of the smart contact lens according to a fifth embodiment of the present disclosure.
Figure 12:
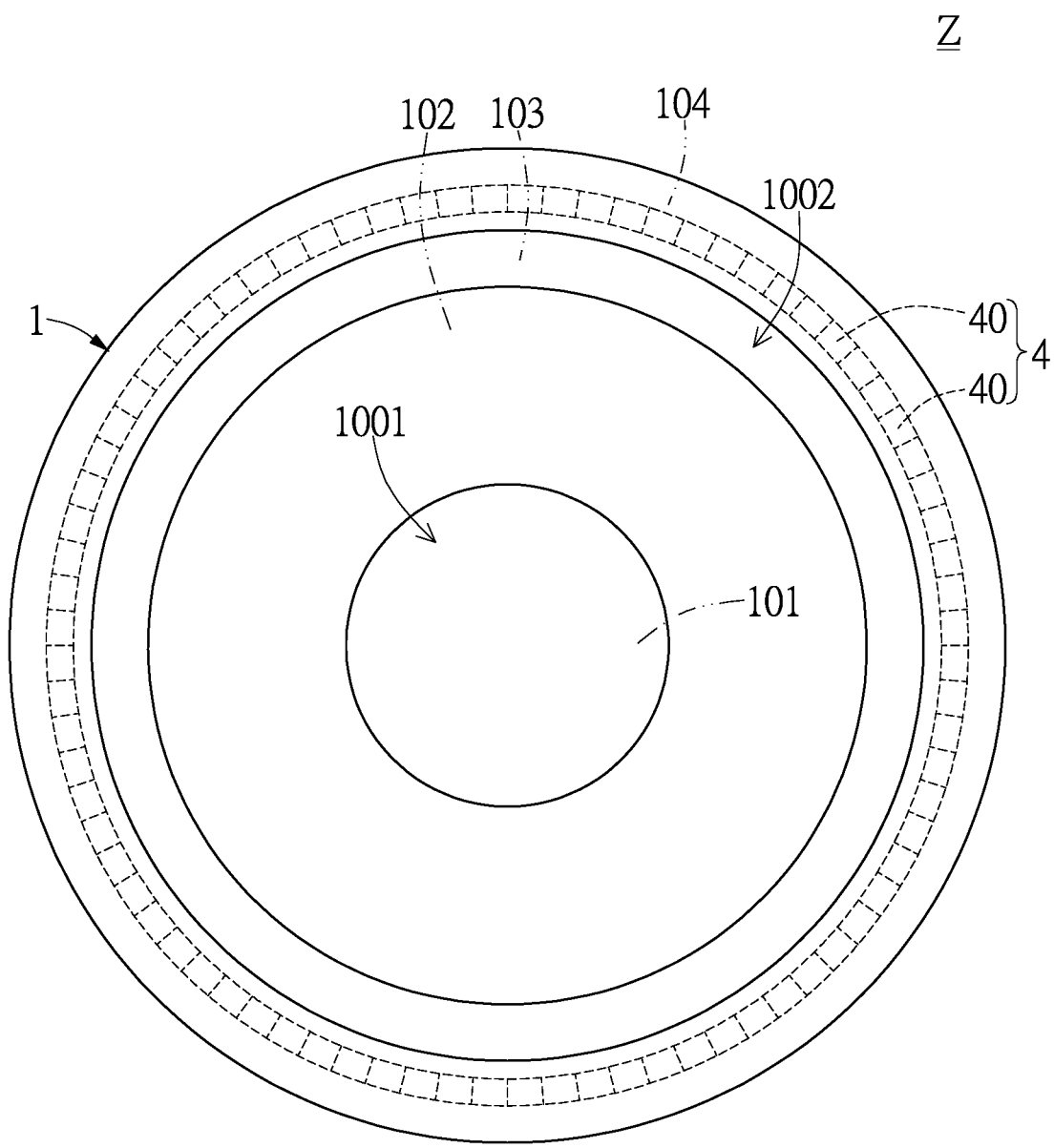
FIG. 12 shows a top schematic view of the smart contact lens according to the fifth embodiment of the present disclosure.

Referring to FIG. 11 and FIG. 12, the fifth embodiment of the present disclosure provides a smart contact lens Z with an image displaying function, including a light-transmitting body 1, a control module (not shown), and an image display module 4.

More particularly, referring to FIG. 1, FIG. 11 and FIG. 12, the light-transmitting body 1 has a view window (such as a first view window 1001), and the control module 2 is received inside the light-transmitting body 1. In addition, the image display module 4 includes a plurality of image display chips 40 received inside the light-transmitting body 1 and electrically connected to the control module 2, and the image display chip 40 diverges from the first view window 1001 by a predetermined horizontal distance (such as a second predetermined horizontal distance H2).

More particularly, referring to FIG. 11 and FIG. 12, the light-transmitting body 1 has a transmission path (such as a second transmission path P2) formed in the light-transmitting body 1 and between the first view window 1001 and the image display module 4, and an external image source L1 is transmitted to the light-transmitting body 1 through the first view window 1001. In addition, the external image source L1 that has been received by the first view window 1001 can directly pass through the light-transmitting body 1 and then be projected onto an eyeball B, and an internal image source L2 generated by cooperation of the image display chips 40 of the image display module 4 can be transmitted to the eyeball B through the second transmission path P2 (that is to say, the internal image source L2 can be transmitted along the second transmission path P2).

More particularly, referring to FIG. 11 and FIG. 12, the light-transmitting body 1 has a first reflective structure 11 and a second reflective structure 12 opposite to the first reflective structure 11. In addition, the internal image source L2 that is generated by cooperation of the image display chips 40 of the image display module 4 can be repeatedly reflected by the first reflective structure 11 and the second reflective structure 12 and then be transmitted to the eyeball B.

Whereby, referring to FIG. 1 and FIG. 11, the control module 2 can provide an information signal S2 according to the image signal S1, and the information signal S2 can be transmitted from the control module 2 to an image display module 4. Therefore, the image display chips 40 of the image display module 4 can be matched with each other according to the information signal S2 for generating an internal image source L2, and then the internal image source L2 can be transmitted from the image display module 4 to the eyeball B.

For example, referring to FIG. 11 and FIG. 12, the light-transmitting body 1 has a first light-transmitting portion 101 connected to the first view window 1001, a second light-transmitting portion 102 surroundingly connected to the first light-transmitting portion 101, a third light-transmitting portion 103 surroundingly connected to the second light-transmitting portion 102, and a fourth light-transmitting portion 104 surroundingly connected to the third light-transmitting portion 103. However, it is merely an example and is not meant to limit the scope of the present disclosure.

It should be noted that the image display module 4 can be disposed inside one of the second light-transmitting portion 102 and the fourth light-transmitting portion 104. For example, the image display module 4 is disposed inside the fourth light-transmitting portion 104 as shown in FIG. 11.

It should be noted that the light-transmitting body 1 of the fifth embodiment can be replaced by the light-transmitting body 1 of the second embodiment as shown in FIG. 7.

Sixth Embodiment

Figure 13:
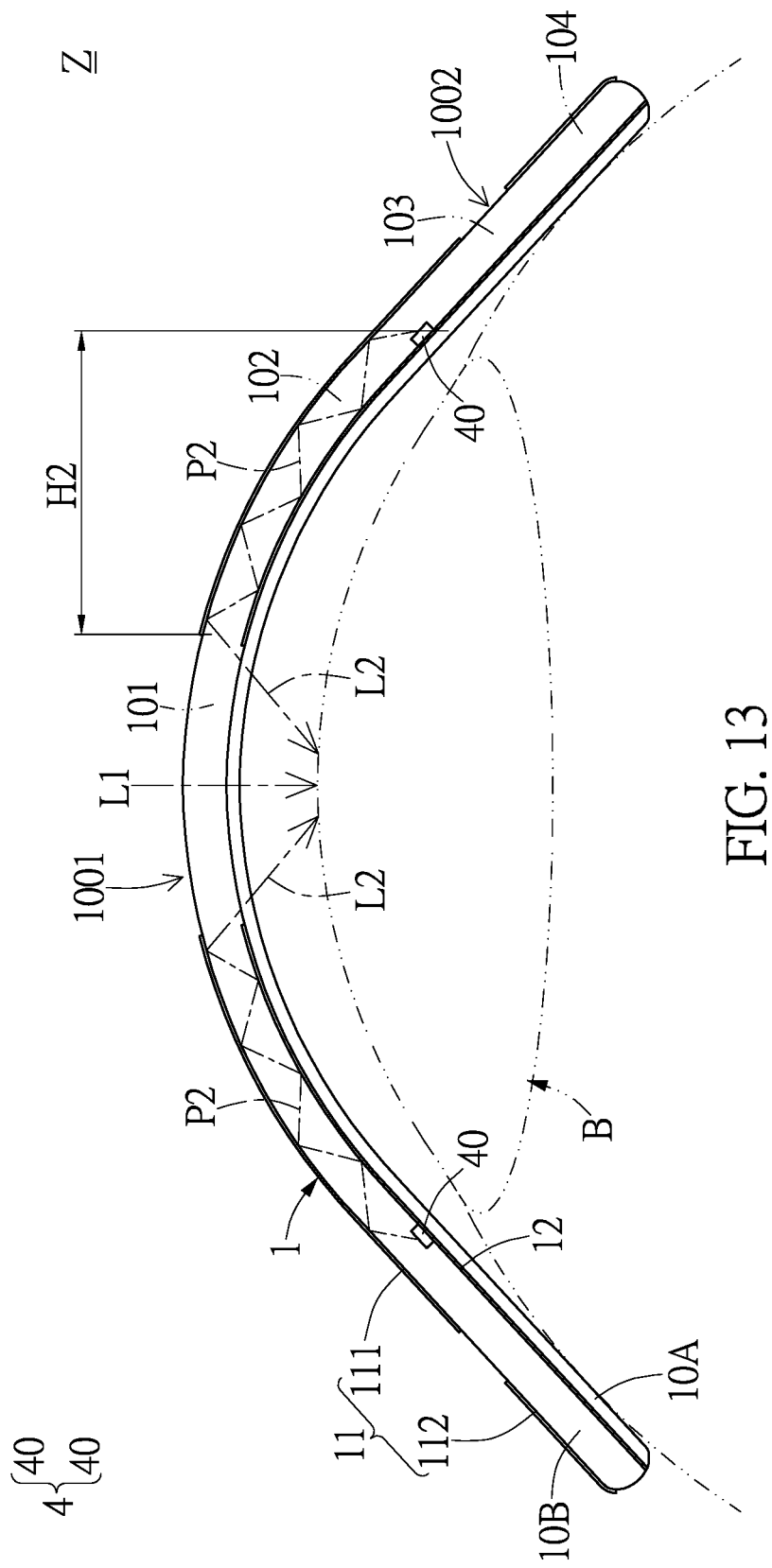
FIG. 13 shows a front schematic view of the smart contact lens according to a sixth embodiment of the present disclosure.

Referring to FIG. 13, the sixth embodiment of the present disclosure provides a smart contact lens Z with an image displaying function, including a light-transmitting body 1, a control module (not shown), and an image display module 4. Comparing FIG. 13 with FIG. 11, the difference between the sixth embodiment and the fifth embodiment is as follows: in the sixth embodiment, the image display module 4 is disposed inside the second light-transmitting portion 102. That is to say, the image display module 4 can be disposed inside the second light-transmitting portion 102 (as shown in the fifth embodiment of FIG. 11) or the fourth light-transmitting portion 104 (as shown in the sixth embodiment of FIG. 13) according to different requirements.

It should be noted that the light-transmitting body 1 of the sixth embodiment can be replaced by the light-transmitting body 1 of the second embodiment as shown in FIG. 7.

Seventh Embodiment

Figure 14:
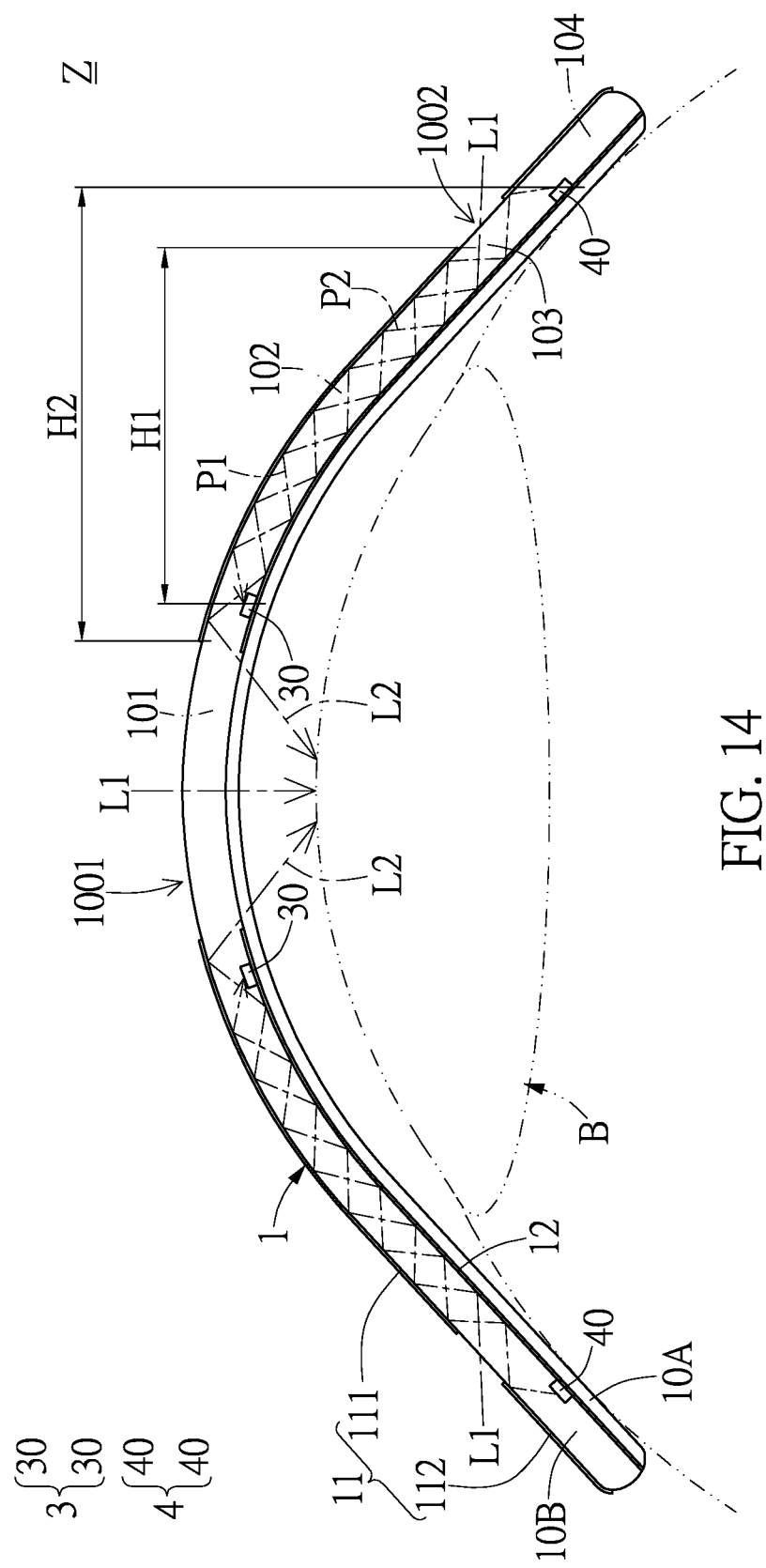
FIG. 14 shows a front schematic view of the smart contact lens according to a seventh embodiment of the present disclosure.
Figure 15:
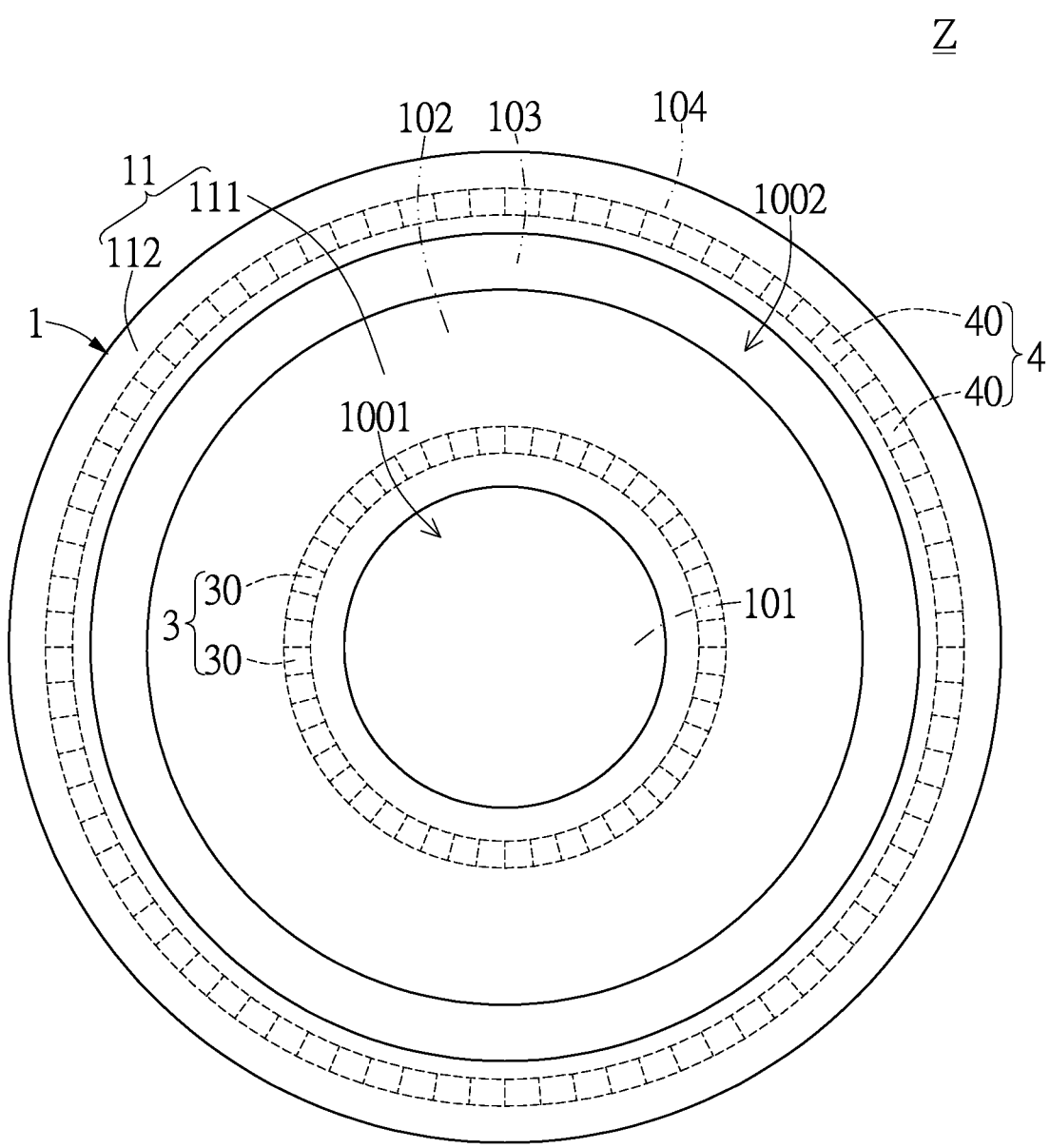
FIG. 15 shows a top schematic view of the smart contact lens according to the seventh embodiment of the present disclosure.

Referring to FIG. 1, FIG. 14 and FIG. 15, the seventh embodiment of the present disclosure provides a smart contact lens Z, including a light-transmitting body 1, a control module 2, an image-sensing module 3, an image display module 4, a wireless transmission module 5, a bio-sensing module 6 and a power supply module 7.

More particularly, referring to FIG. 1, FIG. 14 and FIG. 15, the light-transmitting body 1 has a first view window 1001 and a second view window 1002 surrounding the first view window 1001, and the control module 2 is received inside the light-transmitting body 1. In addition, the image-sensing module 3 includes a plurality of image-sensing chips 30 received inside the light-transmitting body 1 and electrically connected to the control module 2, and the image-sensing chip 30 diverges from the second view window 1002 by a first predetermined horizontal distance H1. Moreover, the image display module 4 includes a plurality of image display chips 40 received inside the light-transmitting body 1 and electrically connected to the control module 2, and the image display chip 40 diverges from the first view window 1001 by a second predetermined horizontal distance H2. Furthermore, the wireless transmission module 5 is received inside the light-transmitting body 1 and electrically connected to the control module 2, the bio-sensing module 6 includes at least one bio sensor chip 60 received inside the light-transmitting body 1 and electrically connected to the control module 2, and the power supply module 7 is received inside the light-transmitting body 1 and electrically connected to the control module 2.

More particularly, referring to FIG. 14 and FIG. 15, the light-transmitting body 1 has a first transmission path P1 and a second transmission path P2. The first transmission path P1 is formed in the light-transmitting body 1 and between the second view window 1002 and the image-sensing module 3, and the second transmission path P2 is formed in the light-transmitting body 1 and between the first view window 1001 and the image display module 4. In addition, an external image source L1 can be transmitted to the light-transmitting body 1 through the first view window 1001 and the second view window 1002 respectively, and the external image source L1 that has been received by the first view window 1001 can directly pass through the light-transmitting body 1 and then be projected onto an eyeball B. Moreover, the external image source L1 that has been received by the second view window 1002 can be transmitted to the image-sensing chips 30 of the image-sensing module 3 through the first transmission path P1, and an internal image source L2 generated by cooperation of the image display chips 40 of the image display module 4 can be transmitted to the eyeball B through the second transmission path P2.

More particularly, referring to FIG. 14 and FIG. 15, the light-transmitting body 1 has a first reflective structure 11 and a second reflective structure 12 opposite to the first reflective structure 11. In addition, the external image source L1 that has been received by the second view window 1002 can be repeatedly reflected by the first reflective structure 11 and the second reflective structure 12 and then be transmitted to the image-sensing chips 30 of the image-sensing module 3, and the internal image source L2 that is generated by cooperation of the image display chips 40 of the image display module 4 can be repeatedly reflected by the first reflective structure 11 and the second reflective structure 12 and then be transmitted to the eyeball B.

Whereby, referring to FIG. 1 and FIG. 14, the image-sensing module 3 can provide an image signal S1 according to the external image source L1 that has been received by the image-sensing module 3, and the image signal S1 can be transmitted from the image-sensing module 3 to the control module 2. Moreover, the control module 2 can provide an information signal S2 according to the image signal S1, and the information signal S2 can be transmitted from the control module 2 to an image display module 4. In addition, the image display chips 40 of the image display module 4 can be matched with each other according to the information signal S2 for generating an internal image source L2, and then the internal image source L2 can be transmitted from the image display module 4 to the eyeball B.

For example, referring to FIG. 14 and FIG. 15, the light-transmitting body 1 has a first light-transmitting portion 101 connected to the first view window 1001, a second light-transmitting portion 102 surroundingly connected to the first light-transmitting portion 101, a third light-transmitting portion 103 connected to the second view window 1002 and surroundingly connected to the second light-transmitting portion 102, and a fourth light-transmitting portion 104 separated from the second view window 1002 and surroundingly connected to the third light-transmitting portion 103. However, it is merely an example and is not meant to limit the scope of the present disclosure.

It should be noted that the image-sensing module 3 can be disposed inside one of the second light-transmitting portion 102 and the fourth light-transmitting portion 104, and the image display module 4 can be disposed inside one of the second light-transmitting portion 102 and the fourth light-transmitting portion 104. That is to say, the image-sensing module 3 can be disposed inside the second light-transmitting portion 102 (as shown in the third embodiment of FIG. 8) or the fourth light-transmitting portion 104 (as shown in the fourth embodiment of FIG. 10) according to different requirements. In addition, the image display module 4 can be disposed inside the second light-transmitting portion 102 (as shown in the fifth embodiment of FIG. 11) or the fourth light-transmitting portion 104 (as shown in the sixth embodiment of FIG. 13) according to different requirements.

Eighth Embodiment

Figure 16:
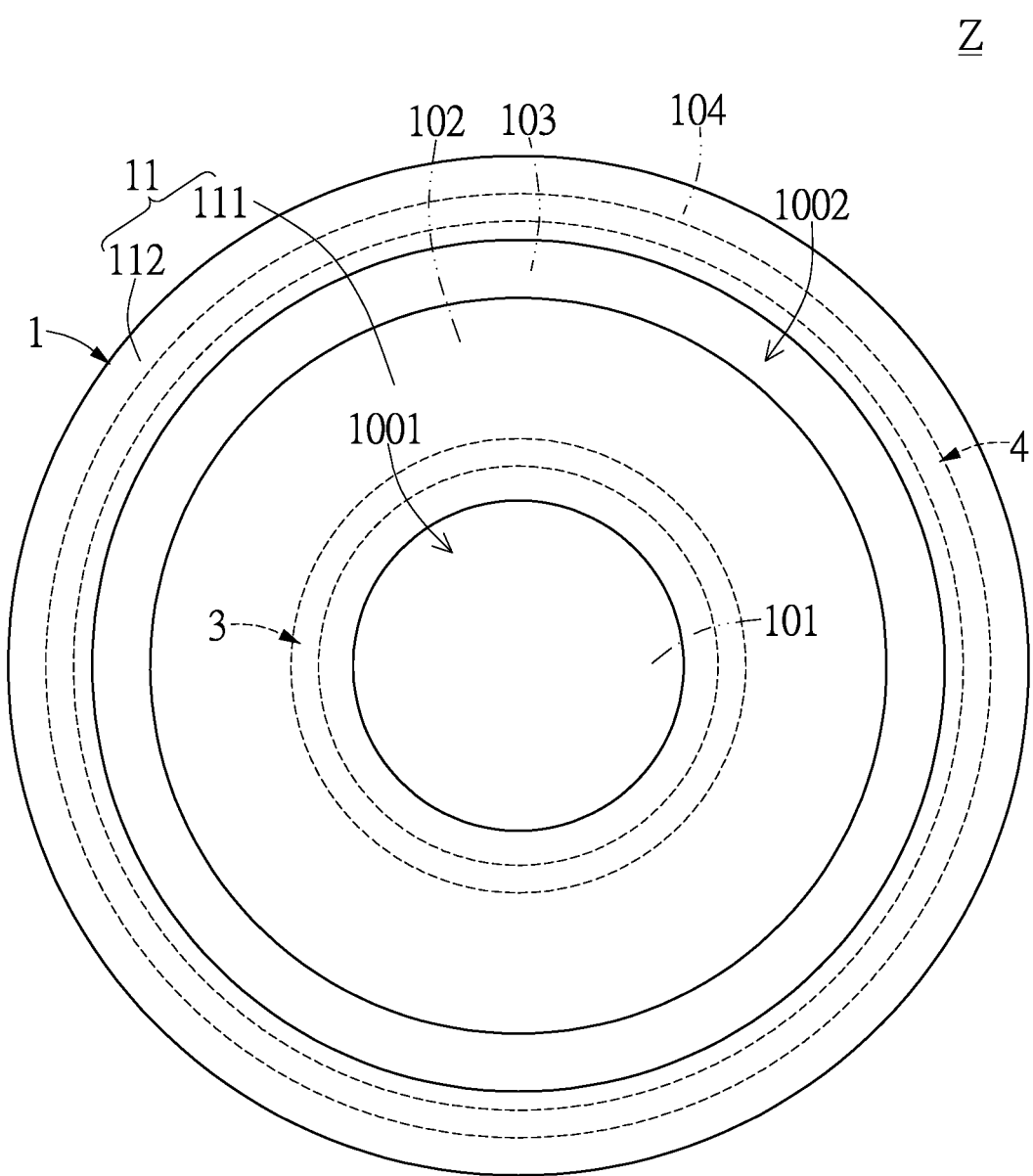
FIG. 16 shows a top schematic view of the smart contact lens according to an eighth embodiment of the present disclosure.

Referring to FIG. 1 and FIG. 16, the eighth embodiment of the present disclosure provides a smart contact lens Z, including a light-transmitting body 1, a control module 2, an image-sensing module 3, an image display module 4, a wireless transmission module 5, a bio-sensing module 6 and a power supply module 7. Comparing FIG. 16 with FIG. 15, the difference between the eighth embodiment and the seventh embodiment is as follows: in the eighth embodiment, the image-sensing module 3 is a single image sensor having an annular sensing area, and the image display module 4 is a single image display having an annular display area.

That is to say, the image-sensing module 3 includes a plurality of image-sensing chips 30 connected one to another or a single image sensor having an annular sensing area, and the image display module 4 includes a plurality of image display chips 40 connected one to another or a single image display having an annular display area.

In conclusion, the internal image source L2 generated by the image display module 4 can be transmitted to an eyeball B through the second transmission path P2 by matching the features of "the light-transmitting body 1 has a first view window 1001" and "the light-transmitting body 1 has a second transmission path P2 formed between the first view window 1001 and the image display module 4".

More particularly, the smart contact lens for displaying images Z can provide a control module 2 having a control function, an image-sensing module 3 having an image-capturing function, an image display module 4 having an image displaying function, a wireless transmission module 5 having a wireless transmission function, a bio-sensing module 6 having a bio-sensing function, or a power supply module 7 having a power supply function by matching the features of "the light-transmitting body 1 is used for totally enclosing one of the control module 2, the image-sensing module 3, the image display module 4, the wireless transmission module 5, the bio-sensing module 6, and the power supply module 7" and "the light-transmitting body 1 has a first view window 1001 and a second view window 1002 surrounding the first view window 1001".

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A smart contact lens for displaying images, comprising:
    a light-transmitting body attached to an eyeball and having a first view window, a second view window, a first reflective structure and a second reflective structure opposite to the first reflective structure;
    a control module received inside the light-transmitting body; and
    an image display module including a plurality of image display chips received inside the light-transmitting body and arranged between the first reflective and the second reflective structure, and electrically connected to the control module, wherein the image display chip diverges from the first view window by a predetermined horizontal distance;
    wherein the light-transmitting body has a first light-transmitting portion, a second light-transmitting portion entirely surrounding and connecting to the first light-transmitting portion, a third light-transmitting portion entirely surrounding and connecting to the second light-transmitting portion, and a fourth light-transmitting portion entirely surrounding and connecting to the third light-transmitting portion, and an external image source is transmitted to the light-transmitting body through the first view window;
    wherein the external image source that has been received by the first view window directly passes through the light-transmitting body and then is projected onto the eyeball, and an internal image source generated by cooperation of the image display chips of the image display module is transmitted to the eyeball;
    wherein the first view window is formed on the first light-transmitting portion, and the second view window is formed on the third light-transmitting portion;
    wherein the internal image source generated by the image display chips of the image display module is reflected by the first reflective structure and the second reflective structure;
    wherein the internal image source is transmitted within the light-transmitting body from the image display chips of the image display module to the first view window;
    wherein the image display chips are connected one to another to form an annular image display module, the first reflective structure and the second reflective structure are two annular reflective structures, and an annular image source generated by the annular image display module is reflected by the two annular reflective structures so as to radially transmit the annular image source to the eyeball;
    wherein the first light-transmitting portion is straightly in front of the eyeball for unobstructedly receiving the external image source, and the first light-transmitting portion only consists of a portion of a first light-transmitting layer and a portion of a second light-transmitting layer.

2. The smart contact lens for displaying images of claim 1, wherein the control module provides an information signal according to an image signal, and the information signal is transmitted from the control module to the image display module, wherein the image display chips of the image display module provide the internal image source according to the information signal, and the internal image source is transmitted from the image display module to the eyeball, wherein the image display chips of the image display module are connected one to another.

3. The smart contact lens for displaying images of claim 1, wherein the internal image source is repeatedly reflected by the first reflective structure and the second reflective structure and then is transmitted to the eyeball.

4. The smart contact lens for displaying images of claim 1, wherein the image display module is disposed inside one of the second light-transmitting portion and the fourth light-transmitting portion.

5. A smart contact lens for displaying images, comprising:
    a light-transmitting body attached to an eyeball and having a first view window, second view window, a first reflective structure and a second reflective structure opposite to the first reflective structure;

a control module received inside the light-transmitting body; and an image display module received inside the light-transmitting body and electrically connected to the control module, wherein the image display module diverges from the view window by a predetermined horizontal distance;

wherein the light-transmitting body has a first light-transmitting portion, a second light-transmitting portion entirely surrounding and connecting to the first light-transmitting portion, a third light-transmitting portion entirely surrounding and connecting to the second light-transmitting portion, and a fourth light-transmitting portion entirely surrounding and connecting to the third light-transmitting portion;

wherein an internal image source generated by the image display module is transmitted to the eyeball;

wherein the first view window is formed on the first light-transmitting portion, and the second view window is formed on the third light-transmitting portion;

wherein the internal image source generated by the image display chips of the image display module is reflected by the first reflective structure and the second reflective structure;

wherein the internal image source is transmitted within the light-transmitting body from the image display chips of the image display module to the first view window;

wherein the image display chips are connected one to another to form an annular image display module, the first reflective structure and the second reflective structure are two annular reflective structures, and an annular image source generated by the annular image display module is reflected by the two annular reflective structures so as to radially transmit the annular image source to the eyeball;

wherein the first light-transmitting portion is straightly in front of the eyeball for unobstructedly receiving an external image source, and the first light-transmitting portion only consists of a portion of a first light-transmitting layer and a portion of a second light-transmitting layer.

6. The smart contact lens for displaying images of claim 5, wherein the control module provides an information signal according to an image signal, and the information signal is transmitted from the control module to the image display module, wherein the image display module provides the internal image source according to the information signal, and the internal image source is transmitted from the image display module to the eyeball.

7. The smart contact lens for displaying images of claim 5, wherein the internal image source is repeatedly reflected by the first reflective structure and the second reflective structure and then is transmitted to the eyeball.

8. The smart contact lens for displaying images of claim 5, wherein the image display module is disposed inside one of the second light-transmitting portion and the fourth light-transmitting portion.

9. The smart contact lens for displaying images of claim 1, wherein the first view window and the second view window of the light-transmitting body are light-transmitting areas to allow the external image source to pass therethrough, and other outer surface of the light-transmitting body is an opaque area.

10. The smart contact lens for displaying images of claim 5, wherein the first view window and the second view window of the light-transmitting body are light-transmitting areas to allow an external image source to pass therethrough, and other outer surface of the light-transmitting body is an opaque area.

11. The smart contact lens for displaying images of claim 5, wherein the first light-transmitting portion is a first transparent portion, the first light-transmitting layer is a first transparent layer, and the second light-transmitting layer is a second transparent layer.

\* \* \* \* \*